United States Patent
Moshe et al.

(10) Patent No.: US 6,738,582 B1
(45) Date of Patent: *May 18, 2004

(54) SYNCHRONIZATION SYSTEM FOR ALL OPTICAL SLOTTED RING DYNAMIC NETWORKS

(75) Inventors: Oren Moshe, Givataime (IL); Shlomo Shachar, Tel Aviv (IL)

(73) Assignee: Martisse Networks, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/200,141

(22) Filed: Jul. 23, 2002

Related U.S. Application Data

(60) Provisional application No. 60/367,275, filed on Mar. 26, 2002.

(51) Int. Cl.[7] .......................... H04S 14/08; H04B 10/06
(52) U.S. Cl. .......................... 398/98; 398/59; 398/154; 398/202; 398/206; 375/327; 375/340
(58) Field of Search .................... 398/98, 59, 154–155, 398/196, 206, 202; 375/327, 329, 340

(56) References Cited

U.S. PATENT DOCUMENTS

| | | | |
|---|---|---|---|
| 4,873,681 A | * 10/1989 | Arthurs et al. | 398/51 |
| 5,093,743 A | * 3/1992 | Eng et al. | 398/51 |
| 5,191,626 A | 3/1993 | Stern | 385/24 |
| 5,696,903 A | 12/1997 | Mahany | 395/200.58 |
| 5,862,131 A | * 1/1999 | Petty et al. | 370/362 |
| 6,493,398 B1 | * 12/2002 | Erisman | 375/295 |
| 2002/0041417 A1 | * 4/2002 | Han et al. | 359/189 |
| 2002/0057479 A1 | * 5/2002 | Takeshita et al. | 359/189 |

OTHER PUBLICATIONS

"SR[3]: A Bandwidth–Reservation MAC Protocol for Multimedia Applications over All–Optical WDM Multi–Rings", Marsan et al, IEEE, 1997.

* cited by examiner

Primary Examiner—Kinfe-Michael Negash
(74) Attorney, Agent, or Firm—Squire, Sanders & Dempsey L.L.P.

(57) ABSTRACT

A method for communicating data over a network having a plurality of nodes thereupon is discussed. A time slot clock signal is transmitted from one node of the plurality of nodes to other nodes of the plurality of nodes. After each of the other nodes of the plurality of nodes receives the time slot clock signal, the time slot clock signal is recalculated to achieve an integer number of slots on the network. The recalculated time slot clock signal is transmitted from the one node of the plurality of nodes to the other nodes of the plurality of nodes.

40 Claims, 5 Drawing Sheets

SYNCHRONIZATION SYSTEM FOR ALL OPTICAL SLOTTED RING DYNAMIC NETWORKS

REFERENCE TO RELATED APPLICATIONS

This application claims priority of U.S. Provisional Patent Application Serial No. 60/367,275, filed on Mar. 26, 2002. The contents of the provisional application is hereby incorporated by reference.

BACKGROUND OF THE INVENTION

1. Field of Invention

The present invention relates to optical networks, such as MAN (metropolitan area networks), SAN (storage area networks) and access optical networks. In particular, the present invention relates to a synchronization scheme for dynamic optical networks, which utilize ultra-fast tunable lasers for direct all-optical routing.

2. Description of Related Art

Fiber-optic infrastructure is a vital part of today's rapidly changing worldwide networks. The drive for interconnectivity as well as the exponential growth in data traffic, as a result of new applications, requires the adoption of new optical solutions. Carriers and service providers are looking to increase their revenue by delivering new services such as storage area networks and IP based services to their customers. New technologies that can leverage the existing network, as well as increase the economic viability of new network applications, are needed. New market opportunities and the recent advances in optical technologies (such as wavelength division multiplexing, tunable lasers and high speed optical/electronic components) have yielded new developments in the optical networks area.

Traditionally, optical networks were used mainly in long-haul area networks. Today, however, new optical networks are being introduced in the regional, metropolitan and the access area networks. The long-haul area networks use a fiber-optic infrastructure to create large data pipes between two distanced points. Contrastingly, the new optical networks are facing different demands.

Optical networks in the regional, metropolitan and the access area networks require a sustained, high bandwidth, while maintaining mesh connectivity and supporting multiple services and multiple classes of service. For example, metropolitan area networks can transport voice traffic, SAN traffic and other IP traffic. Voice traffic demands low bandwidth, with a guaranteed bandwidth, while SAN traffic is delay sensitive and is burst traffic. An IP traffic class of service is application dependent. Optical network are required to aggregate multiple types of data and transport while keeping the required quality of service.

Communication networks can be divided into two general types: circuit-switched networks (typically used for telephony traffic) and packet-switched networks (typically used for data traffic). Circuit-switched networks (like SONET or SDH) are networks wherein connections between nodes are fixed, whether data are crossing the connection or not. Each connection in a circuit-switched network has a constant-bandwidth. Packet-switched networks, on the other hand, are connectionless networks, wherein data is transmitted in a burst mode. The benefit of packet-switched networks is that bandwidth is used more optimally. However the connectionless networks lack the ability to reserve bandwidth, and support a hard quality of service. Moreover the statistic aggregation of packets can create an overload situation, in which packets may suffer large delays or even data loss.

All optical networks are basically packet-switched networks, in which routing packets from a source node to a destination node is done optically, without the need for optical-electrical conversions outside the source and destination nodes. A sub-group of the all-optical networks is the all-optical multi-ring networks. Optical multi-ring networks are based on a fiber ring topology, in which the fiber-ring is a shared optical medium. Nodes, located around the fiber-ring, are equipped with optical receiver, fixed to a unique wavelength, and with an ultra-fast tunable transmitter. In a multi-ring optical network each wavelength is associated with a specific node. Transmitting packets to destination node is done by a tunable-laser tuned to the destination wavelength. Logically the network is a multi-ring topology, which allows any node to address any other node simply by changing its transmitter wavelength to the target's receiver wavelength without electrical routing.

As in other shared media topologies, in the packet switched multi-ring topology, the problem of collisions when accessing the fiber must be addressed. There are two main approaches to resolve packets collision problems: 1) an Ethernet-like scheme where carrier detection is applied or 2) a synchronous system where collision can't happen since each participant (node) has a reserved time when it can use the media. By giving each node a required time or time frame in which it can use the media, a synchronizing scheme between all the nodes needs to be implemented. In the case of optical slotted ring dynamic networks, packets can be transmitted to the fiber in dedicated time slot boundaries. The optical media poses special problems that need to be overcome with respect to the slot synchronization.

Furthermore, since packets can be transmitted from any one node to any other node on the fiber ring, frequency, phase and the position of the payload inside the time slot cannot be guaranteed. Synchronizing on the signal frequency and phase, and recognizing the payload should be done within a fraction time of the packet duration and calls for fast synchronization solutions.

Thus, there is a need for a synchronization scheme that addresses the problems discussed above for use in dynamic optical networks. There is also a need for a process and system that overcomes the problem of time slot synchronization between the nodes on the fiber ring so it is possible for each node to access the fiber without collisions. Further more, in the context of this synchronization method, there is also a need to define a method to recover the packet's data and clock in an ultra-fast recovery time.

SUMMARY OF THE INVENTION

It is an object of this invention to overcome the drawbacks of the above-described conventional network devices and methods. The present invention provides for a new synchronization method for an optical slotted ring dynamic network. With this approach, nodes that send packets to the same destination node must access the fiber at a designated time-slot. The synchronizing signal is sent from a master node to the other nodes. The present invention also provides for a burst mode receiver used to receive and process an optical signal.

According to one aspect of this invention, a method for communicating data over a network having a plurality of nodes thereupon is disclosed. A time slot clock signal is transmitted from one node of the plurality of nodes to other nodes of the plurality of nodes. After each of the other nodes of the plurality of nodes receives the time slot clock signal and a return signal is received, the time slot clock signal is recalculated to achieve an integer number of slots on the network. The recalculated time slot clock signal is transmitted from the one node of the plurality of nodes to the other nodes of the plurality of nodes.

Additionally, the method may be applicable to an optical fiber ring network and the time slot clock signal may be transmitted from the one node to the other nodes of the optical fiber ring network. Also, the method may include waiting for a last of the other nodes of the optical fiber ring network to send a signal to the one node of the optical fiber ring network. In addition, the method may be performed periodically to maintain the integer number of slots on the network.

In addition, the step of recalculating the time slot signal to achieve an integer number of slots on the network can include changing a duration of the time slot used in the time slot clock signal and/or changing the optical length of the optical fiber ring network. The change in the optical length is used to make a rough adjustment to achieve the integer number of slots and the change in the duration of the time slot is used to make a fine adjustment to achieve the integer number of slots. The optical length of the optical fiber ring network may be changed by adjusting an optical delay line.

Also in the method embodiments of the present invention, a system bit clock signal may be transmitted that includes the time slot clock signal contained therein. Also, a packet may be transmitted from a particular node of the plurality of nodes to another node of the plurality of nodes within one of the integer number of slots on the network and the packet can also include inserted guard times before and after the packet within the one of the integer number of slots. Additionally, the packet may include a preamble, a barker and a packet payload, where the barker is used by a receiver of the another node of the plurality of nodes to extract the packet payload.

The method may also include waiting for the time slot clock signal to pass through a coupler connected with each of the other nodes of the plurality of nodes and to arrive back at the one node. Also, the time slot clock signal may be received and retransmitted by each of the other nodes of the plurality of nodes, before it arrives back at the one node. Signal data may be added or dropped from the time slot clock signal when the time slot clock signal is received and retransmitted by each of the other nodes. Also, one node of the plurality of nodes may be a master node that transmits and maintains a system bit clock using a broadcast wavelength.

In another aspect of the invention, a communications node for an optical fiber network is disclosed. The communication node includes a fixed wavelength receiver for receiving optical data, a tunable wavelength transmitter for transmitting optical data to destination nodes at a plurality of destination wavelengths and a media access controller that determines a slot clock based on a system clock signal received by the fixed wavelength receiver time slots. The tunable wavelength transmitter uses the slot clock to determine a slot in which the optical data is to be transmitted. The fixed wavelength receiver may include a phase-lock-loop. The fixed wavelength receiver may be a burst mode receiver and may include a phase shifter to provide a phase-shifted system clock. Also, fixed wavelength receiver may have at least two direct digital synthesizers receiving the same control signal from a controller, used to shift the phase of the receiving optical data. The fixed wavelength receiver can also be capable of creating a phase controlled high bitrate clock.

In another aspect of the invention, a burst mode receiver is disclosed. The burst mode receiver includes a phase shifter, receiving a system clock and producing a phase-shifted clock, a controller in communication with and controlling the phase shifter and a sample unit, receiving a phase-shifted clock and producing sampled data. The phase shifter may include at least two direct digital synthesizers receiving the same control signal from a controller, used to shift the phase of the receiving optical data. Additionally, the burst mode receiver may be capable of creating a phase controlled high bitrate clock.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

Figure 1:
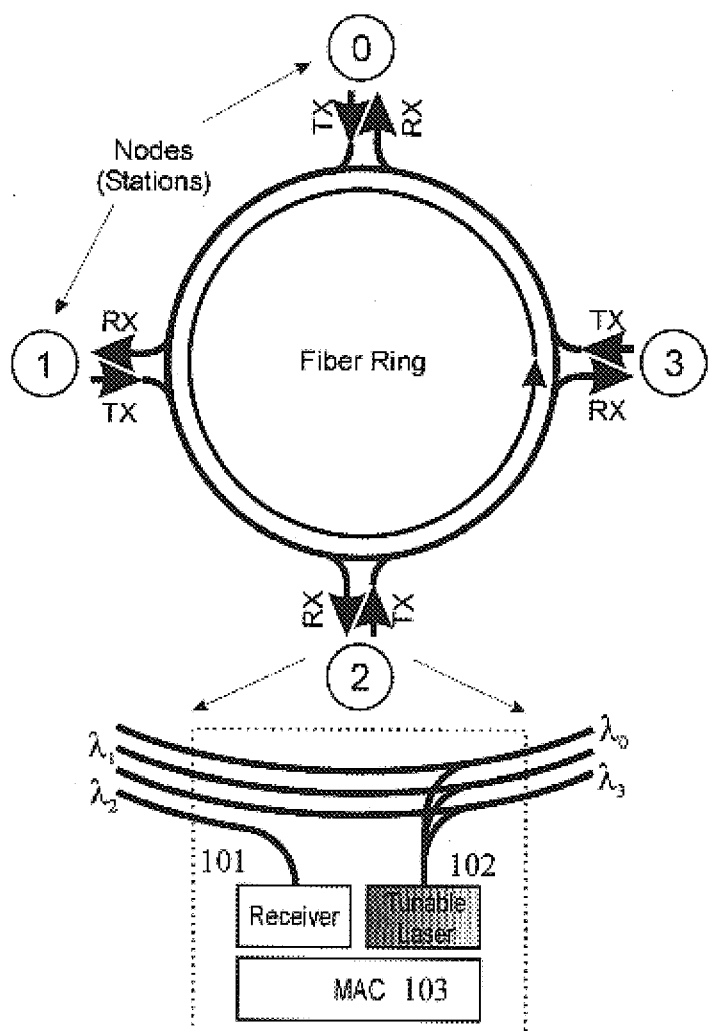
FIG. 1 illustrates all-optical multi-ring network with four nodes, and a schematic implementation of node #2, where node #2 drops wavelength #2, while other wavelengths pass thru the node.
Figure 3:
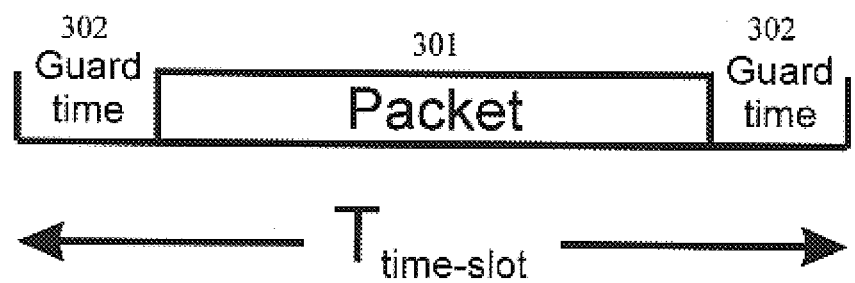
FIG. 3 shows the packet position inside the time slot.

The invention is directed, in part, to a synchronization scheme for an all-optical network, in which nodes are equipped with an ultra-fast tunable laser transmitter and a fixed receiver. As shown in FIG. 1, each node station has a receiver 101 tuned to a specific wavelength and a tunable laser 102 for transmitting to the other nodes. Both the laser and receiver are in communication with the Media Access Control (MAC) 103. According to the present invention, the synchronization scheme defines any one of the nodes as a master-node (or referred to as the origin-node). The master-node can be any of the network nodes and may perform additional tasks such as synchronization signal distribution and reservation algorithm execution.

As discussed above, optical packet networks can be divided into two types: slotted networks and unslotted networks. Slotted networks are synchronous networks in which all the packets have the same fixed size and are transmitted inside fixed time slots. On some systems, the time slot's duration can be larger then the packet transmission duration due to guard times and headers. Unslotted networks are asynchronous networks in which the packets can have a variable size and are not transmitted within a time slot. The present application has particular relevance to optical slotted packet networks based on an optical ring topology and proposes a method to synchronize such a network.

Figure 2:
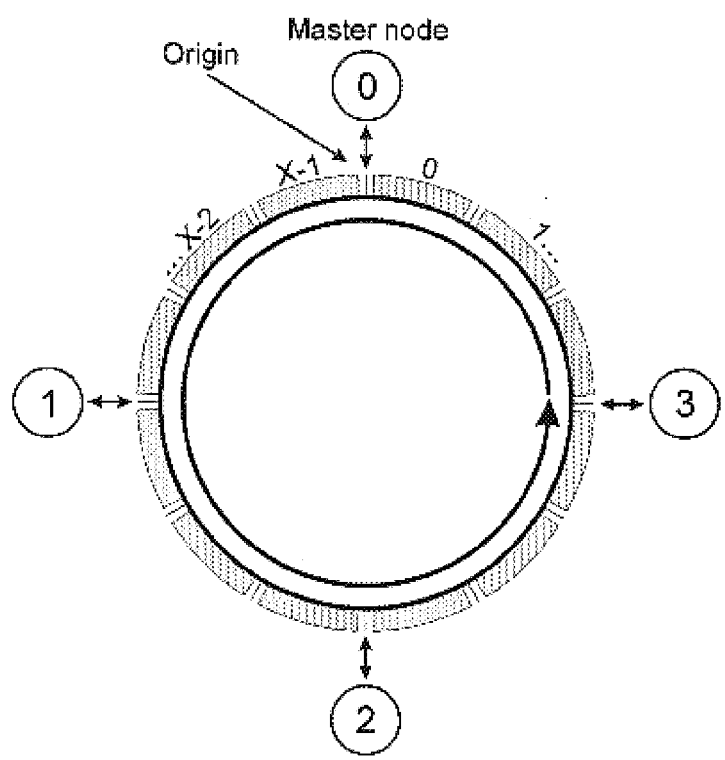
FIG. 2 illustrates the slots on the slotted network over an optical ring, where the slots are rotating in the ring at one direction.

In a slotted network topology over an optical ring, slots are rotating in the ring in one direction, as shown by the circular arrow in FIG. 2. Nodes add packets to the rotating slots in the transmission direction and drop packets from the slots on the receiving direction.

Figure 4:
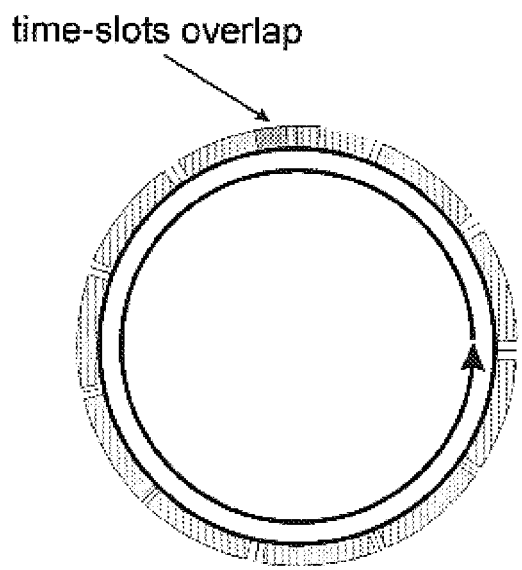
FIG. 4 illustrates the case where the number of slot on the ring is not of an integer number of slots, the tail slot overlap the head slot.

In this access method, a global synchronization scheme is needed in order for nodes to be synchronized on the slots boundaries. In a synchronous slotted ring the number of slots on the ring must be an integer number. In the case where the number of slot on the ring is not of an integer number of slots, the tail slot will overlap the head slot, as shown in FIG. 4. Overlapping makes it impossible for the scheme to be collision free.

Since all the nodes are synchronized on a global slot clock, a synchronization jitter between nodes can be created. Moreover, when the slot is used to transmit packets with different wavelengths, a "walk-off" between packets is created, due to the chromatic dispersion. In order to avoid packet overlap, guard times are required. FIG. 4 shows the packet 301 positioned inside the time slot. A guard time 302 is placed before and after the data packet payload inside a time slot.

Since each node receives packets from different destinations, the packet phase and the position of the packet inside the slots is not precisely known. A burst receiver is needed at the receiving node for phase locking and to determine the packet's position in the slot. The burst receiver uses a preamble header, which each packet has; where the preamble header contains a "barker" to mark the beginning of the payload.

The system can be implemented with or without a single system clock. On a synchronized ring operating with a single system clock, one node (master node) broadcasts a system-clock signal that is locked onto by all the other nodes. The system-clock is used, by each node, for transmitting data to other nodes, for sampling the received data signals and for slot synchronization. When the system is implemented with no single system clock, the broadcast channel can be used for slot synchronization alone.

In order to keep the slots from overlapping, slots boundaries can be determined by a single source. In the case where the system is implemented using a single system clock, the master node transmits the time-slot clock by transmitting a cyclic series with the slots-clock cycle. At the slave nodes, a correlator tuned to this series can be used for recovering the time-slot clock. The transmitted series propagates around the ring and returns to the master node. A locking mechanism at the master node then changes the time-slot duration to eliminate the slots overlapping. The time-slot duration is controlled through the change in the series sequence phase. This is done by changing the sequencer reset times.

In order to achieve an integer number of time slots on the ring, the size of the physical ring can be changed (by using a configurable optical delay line), or the packet size could be changed. On rings having large lengths, where there is a high number of slots on a ring, a small change in the packet size is multiplied by the number of slots. In this case, a higher guard time could absorb the packet size change. On shorter rings, changing the guard time is not enough, and the payload size must be changed in order to keep a constant bit rate. In this embodiment, the Master node is responsible of measuring the ring length and then to determine the optical delay line configuration and the time-slot size.

Figure 5:
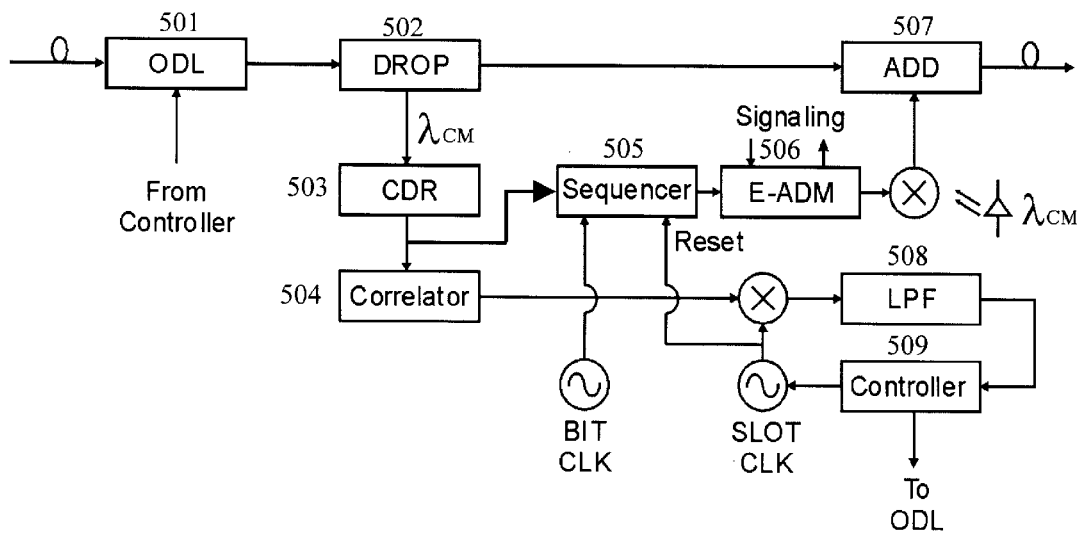
FIG. 5 illustrates the master node PHY, according to one embodiment of the present invention, responsible of the synchronization channel, and the slots locking mechanism.

In addition to the regular PHY tasks, the PHY at the master node should maintain an integer number of slots on the fiber. The PHY at the master node has a locking mechanism to accomplish this task. FIG. 5 illustrates the master node PHY, according to one embodiment of the present invention. The first stage provides for a rough adjustment of the ring length, where the adjustment is performed through a tunable optical delay line (ODL) 501. The second stage is for small adjustment and is done by a Phase Locked Loop (PLL) that is locked to the slot clock signal. The PLL is made up of, in this embodiment, of a drop component 502 that takes part of the signal that is processed by the Clock and Data Recovery (CDR) component. The output from the CDR is sent to the correlator 504 and to the sequencer 505. The correlator 504 produces a slot clock signal and provides this signal to a phase detector where it is multiplied with the output of a voltage control oscillator (VCO). The output of the phase detector is sent to a low pass filter 508 and then to a controller 509 to produce a clean slot clock without the jitter that may be present in the derived slot clock signal. The clean slot clock and the bit clock are input into a sequencer and the sequencer outputs a signal to the add/drop multiplexer 506 (ADM). The multiplexer allows for a signal specific to that node to be extracted or added. The multiplexed signal is sent to a modulator along with a signal from the light source tuned to the broadcast wavelength. The new signal is added back to the ring to be received by the next node.

Sending the time-slot clock on the same phase as the received signal assures that slots are not overlapping. The PLL adjustments are used to set the time-slot duration. The duration of the time-slot clock is changed by changing the series sequence phase (by resetting the sequence). A signaling channel can be added over the broadcast wavelength as well using an electrical add and drop.

In the case where the bit clock is not distributed, the time-slot clock is transmitted directly over the broadcast wavelength and a simple PLL can be used to recover the clock.

The ring length and the slot size determine the slot clock adjustments. Given that the residue (the excess partial time slot on the ring) is divided between all of the slots on the ring, a clock adjustment is needed, where the residue is divided between each of the number of slots. Since on small rings the needed adjustment might be too large for the system needs, it is possible to artificially change the original ring size. This can be done, for example, at the master node using a tunable optical delay line.

Figure 6A:
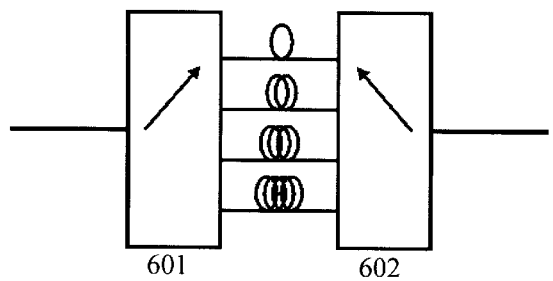
FIGS. 6a and 6b illustrate optical delay lines (ODL), with FIG. 6(a) illustrating schematically a parallel ODL and FIG. 6(b) illustrating schematically a serial ODL.

An example of a tunable optical delay line illustrated in FIG. 6(a) has four delays positions: none, 1/4 slot, 1/2 slot and 3/4 slot. This delay line can be used to reduce the residue. By changing the source clock, the remaining residue will be then eliminated. Hence, the maximum clock adjustment can be reduced by a factor of four.

In one embodiment, a Parallel Optical Delay Line may be used, as illustrated in FIG. 6(a). The Parallel Optical Delay Line two 1:N optical switches switch between N fibers of 0 to 1 time slot lengths. The two switches have to get the same control. The granularity of this ODL is dependent on the number of ports each optical switch has.

Figure 6B:
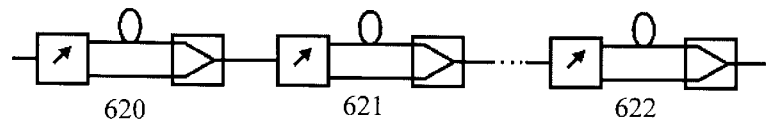

In another embodiment, a Serial Optical Delay Line may be used. A Serial Optical Delay Line, as illustrated in FIG. 6(b), can have N stages; each stage can include a 1:2 switch, a delay line and a combiner. By changing the state of each of the N switches, $2^N$ different delays are possible. A relatively high Insertion Loss, however, is one penalty in this configuration.

The system can be implemented with or without a globally synchronized bit clock. When the bit clock is distributed, slot synchronization is accomplished by transmitting a repeating sequence over the broadcast bit clock channel, onto which each node locks. In the case the bit clock is not distributed, the slot clock is transmitted directly over the broadcasted channel. In both cases, the broadcast wavelength is dropped at each node, reconstructed and transmitted again in a daisy chain manner.

Figure 7:
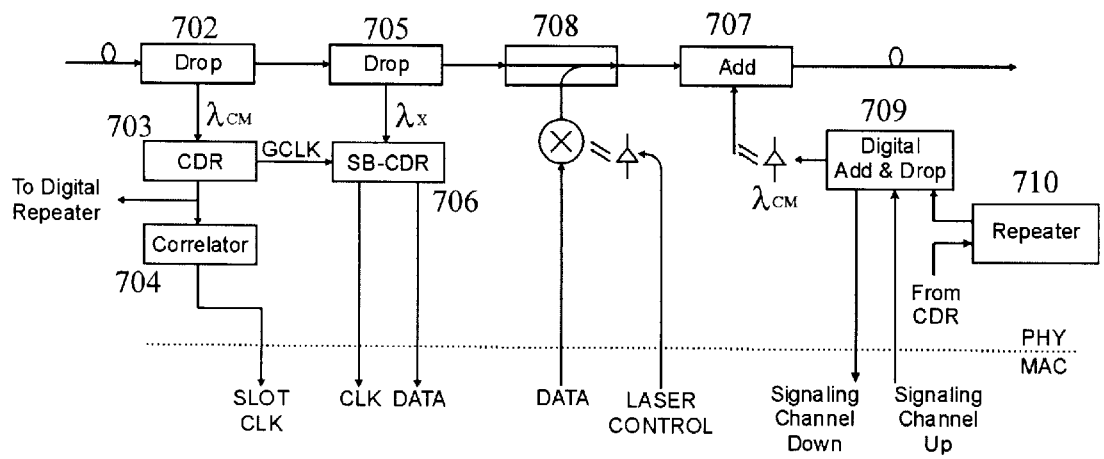
FIG. 7 illustrates a regular node PHY, according to one embodiment of the present invention, responsible of the synchronization channel, and the slots locking mechanism.

The PHY at the regular nodes is illustrated in FIG. 7. In the first stage the System Clock and the Slot Clock are recovered. The signal is received at the drop 702 and a conventional CDR 703 extracts the Data & the CLK from the broadcasted wavelength. The clock extracted is used as the system clock, and the data is used to extract the Slot clock. The data transmitted over the broadcast wavelength is a cyclic series with a cycle of the Slot Clock rate. A correlator 704 tuned to this series is used for recovering the slot clock.

In the next stage, the node's specific wavelength is dropped 705 and sampled using a Synchronous burst mode receiver (SB-CDR) 706. The SB-CDR generates a clock synchronous to the data received using a phase shifter. The use of a phase shifter assures a fast locking time. Next, packets are added 708 to the fiber using the tunable laser, and on the last stage, the broadcast wavelength is retransmitted 707 after it has passed through an O-E-O conversion and signaling data is added and dropped 709 & 710.

Figure 8:
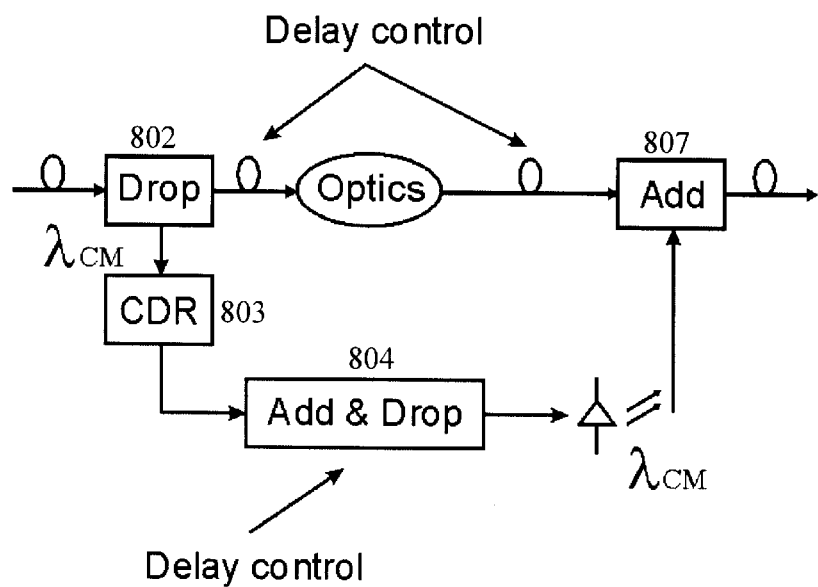
FIG. 8 illustrates a delay control process that compensates accumulated delay for the broadcast wavelength.

As can be seen, the broadcast wavelength is recovered at each node, and retransmitted in a daisy-chain manner. Since the data is recovered and retransmitted, the internal delay of the electronics might cause a phase shift of up to one broadcast wavelength clock. This delay is accumulated at each node on the ring, and should be considered in the packet guard time. Alternatively, this delay can be minimized through the use of an appropriate delay control, either by optics or an electrical delay, as shown in FIG. 8.

In the case where the Slot Clock is transmitted directly over the broadcast wavelength, a simple PLL can be locked over the returning signal. The slot clock, transmitted by the master node, propagates around the ring to all the nodes. Each node drops the clock signal wavelength, and converts the optical signal to electrical. Since the slot clock needs to have low jitter/noise characteristics, a phase-lock-loop (PLL) can be used to recover a clean clock. In any of the methods, the recovered slot clock is used to time the node transmitter and receiver, and thus avoid overlapping between slots.

Since the system bit clock is distributed and each node transmits the packet bits using a clock derived from the system clock, the receiver doesn't need a frequency lock. Bit synchronization can be achieved by merely shifting the clock phase using a phase shifter based burst receiver. Shifting the phase alone can be done much faster than the frequency and phase locking that the traditional PLL receiver does.

Figure 9:
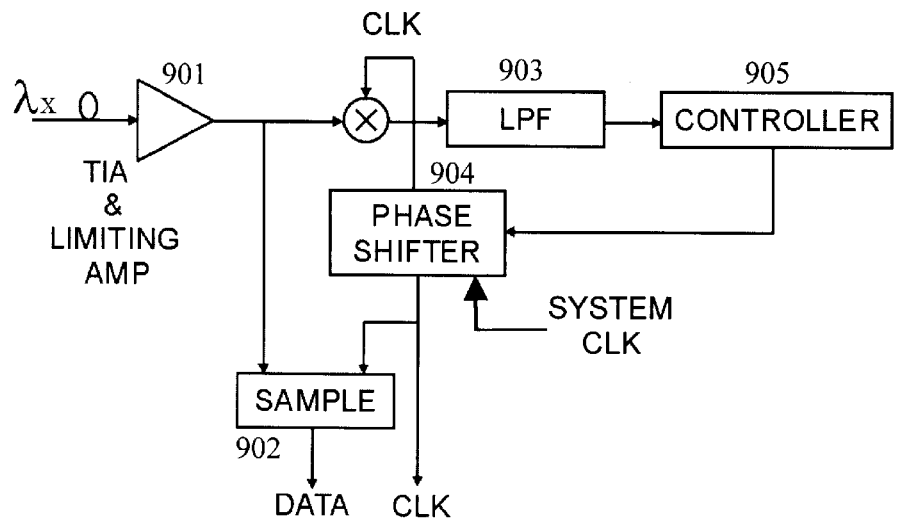
FIG. 9 illustrates a Synchronous burst mode receiver diagram, according to one embodiment of the present invention.

An example of a Synchronous burst mode receiver is illustrated in FIG. 9. Since the system clock is known, the data frequency is known as well. The SB-CDR uses the system clock as a reference for the phase deviation measurement. The phase deviation measurement is used in adjusting the phase shifter and the phase-shifted clock is then used for sampling the data. The SB-CDR phase locking is done in two stages. In the first stage the phase shifter is shifted directly to the calculated phase. In the second stage the correct phase is kept during the packet transmission by slower corrections. The input signal is limited by a limiting amplifier 901 and the output is sent to both the phase detector and the sample unit 902. The phase detector operates on a clock signal from the phase shifter 904 with the input signal. The output of the phase detector is sent to a low pass filter 903 and to a controller 905 for the phase shifter. The phase-shifted clock is also sent to the sample unit 902 to sample the data.

Normally, a source node transmits a packet within the time-slot boundaries, using the appropriate guard times. However, due to the fact that destination node receives packets from multiple source nodes; the packet's position inside the time-slots is not known. In order to recognize the packet payload, a "barker" is placed between the preamble and the packet payload. The digital receiver recognizes the barker, and extracts the payload.

On a synchronized ring operating with a single system clock, one node (master node) broadcasts a system-clock signal that is locked onto by all of the other nodes. The system-clock is used, at each node, for transmitting data to other nodes and for sampling the received data signals. However, the nodes are located at different distances from each other and have different electrical/optical inner-delays; this means that although all the source nodes transmit signals using the same clock, the destination node gets a phase shifted signal depending on the source node location/delay.

In order to handle the shift delays and avoid the need for a burst receiver and/or the penalty of a PLL locking time, the receiving nodes can use a phase-shifter scheme. In the phase-shifter scheme, the bit clock frequency is known. The known frequency clock is shifted by the phase shifter to the correct bit clock phase. The phase shift needed is determined from a phase detector. The correct phase is kept during the packet transmission by slow corrections.

Figure 10:
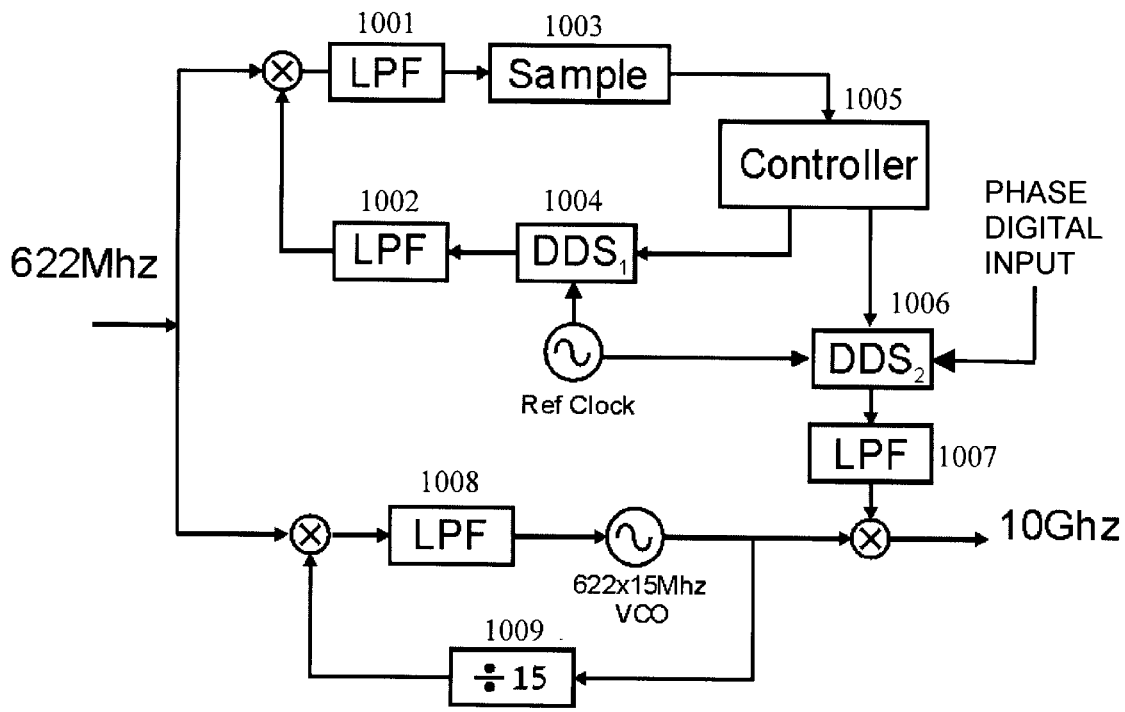
FIG. 10 illustrates one implementation of a 10 GHz clock phase shifter according to one aspect of the present invention.

An embodiment of a 10 GHz clock phase shifter implementation is illustrated in FIG. 10: One Direct Digital Synthesizer (DDS) 1004 is used as a VCO in a Phase Locked Loop. Its frequency and phase are locked to the 622 MHz system-clock. A second DDS 1006 receives the same control words, from the controller 1005, as the first DDS so its output is the same as the first DDS. By adding a constant value to the control words, the second DDS keeps track of the input frequency, but with a different phase. The phase-shifted output is then multiplied with a 15×system clock, creating a phase controlled 10 Gbit clock.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A method of communicating data over a network having a plurality of nodes thereupon, said method comprising the steps of:

transmitting a time slot clock signal from one node of said plurality of nodes to other nodes of said plurality of nodes;

waiting for a return signal from at least one of said other nodes of said plurality of nodes;

recalculating the time slot clock signal to achieve an integer number of slots on the network based on said return signal; and transmitting the recalculated time slot clock signal from the one node of said plurality of nodes to the other nodes of said plurality of nodes.

2. A method as recited in claim 1, wherein said network comprises an optical fiber ring network and said step of transmitting a time slot clock signal comprises transmitting a time slot clock signal from the one node to the other nodes of said optical fiber ring network.

3. A method as recited in claim 2, wherein said step of waiting for the return signal from at least one of said other nodes of said plurality of nodes comprises waiting for a last of said other nodes of said optical fiber ring network to send the return signal to the one node of said optical fiber ring network.

4. A method as recited in claim 1, wherein said method is performed periodically to maintain the integer number of slots on the network.

5. A method as recited in claim 2, wherein the step of recalculating the time slot signal to achieve an integer number of slots on the network comprises at least one step of:

changing a duration of the time slot used in the time slot clock signal; and changing the optical length of the optical fiber ring network.

6. A method as recited in claim 5, wherein the step of changing the optical length is used to make a rough adjustment to achieve the integer number of slots and the step of changing the duration of the time slot is used to make a fine adjustment to achieve the integer number of slots.

7. A method as recited in claim 5, wherein the step of changing the optical length of the optical fiber ring network comprises adjusting an optical delay line.

8. A method as recited in claim 1, wherein said step of transmitting a time slot clock signal comprises transmitting a system bit clock signal that includes the time slot clock signal contained therein.

9. A method as recited in claim 1, further comprising the step of transmitting a packet from a particular node of said plurality of nodes to another node of said plurality of nodes within one of said integer number of slots on the network.

10. A method as recited in claim 9, wherein the step of transmitting a packet further comprises inserting a guard time before and after the packet within said one of said integer number of slots.

11. A method as recited in claim 9, wherein said packet comprises a preamble, a barker and a packet payload, where the barker is used by a receiver of said another node of said plurality of nodes to extract the packet payload.

12. A method as recited in claim 2, wherein the step of waiting for the return signal from at least one of said other nodes of said plurality of nodes comprises waiting for the time slot clock signal to pass through a coupler connected with each of said other nodes of said plurality of nodes and to arrive back at said one node.

13. A method as recited in claim 2, wherein the step of waiting for the return signal from at least one of said other nodes of said plurality of nodes comprises waiting for the time slot clock signal to be received and retransmitted by each of said other nodes of said plurality of nodes and arrive back at said one node.

14. A method as recited in claim 13, wherein signal data is added or dropped from the time slot clock signal when the time slot clock signal is received and retransmitted by each of said other nodes.

15. A method as recited in claim 1, wherein said one node of said plurality of nodes is a master node that transmits and maintains a system bit clock using a broadcast wavelength.

16. A communications node for communicating data over a network having a plurality of nodes thereupon, comprising:

means for transmitting a time slot clock signal from one node of said plurality of nodes to other nodes of said plurality of nodes;

means for waiting for the return signal from at least one of said other nodes of said plurality of nodes;

means for recalculating the time slot clock signal to achieve an integer number of slots on the network based on said return signal; and means for transmitting the recalculated time slot clock signal from the one node of said plurality of nodes to the other nodes of said plurality of nodes.

17. A communications node as recited in claim 16, wherein said network comprises an optical fiber ring network and said means for transmitting a time slot clock signal comprises means for transmitting a time slot clock signal from the one node to the other nodes of said optical fiber ring network.

18. A communications node as recited in claim 17, wherein said means waiting for the return signal from at least one of said other nodes of said plurality of nodes comprises means for waiting for a last of said other nodes of said optical fiber ring network to send the return signal to the one node of said optical fiber ring network.

19. A communications node as recited in claim 16, wherein the communications node is configured to periodically maintain the integer number of slots on the network.

20. A communications node as recited in claim 17, wherein the means for recalculating the time slot signal to achieve an integer number of slots on the network comprises at least one step of:

means for changing a duration of the time slot used in the time slot clock signal; and means for changing the optical length of the optical fiber ring network.

21. A communications node as recited in claim 20, wherein the means for changing the optical length is configured to make a rough adjustment to achieve the integer number of slots and the means for changing the duration of the time slot is configured to make a fine adjustment to achieve the integer number of slots.

22. A communications node as recited in claim 20, wherein the means for changing the optical length of the optical fiber ring network comprises means for adjusting an optical delay line.

23. A communications node as recited in claim 16, wherein said means for transmitting a time slot clock signal comprises means for transmitting a system bit clock signal that includes the time slot clock signal contained therein.

24. A communications node as recited in claim 20, further comprising means for transmitting a packet from a particular node of said plurality of nodes to another node of said plurality of nodes within one of said integer number of slots on the network.

25. A communications node as recited in claim 24, wherein the means for transmitting a packet further comprises means for inserting a guard time before and after the packet within said one of said integer number of slots.

26. A communications node as recited in claim 24, wherein said packet comprises a preamble, a barker and a packet payload, where the barker is used by a receiver of said another node of said plurality of nodes to extract the packet payload.

27. A communications node as recited in claim 17, wherein the means for waiting for the return signal from at least one of said other nodes of said plurality of nodes comprises means for waiting for the time slot clock signal to pass through a coupler connected with each of said other nodes of said plurality of nodes and to arrive back at said one node.

28. A communications node as recited in claim 17, wherein the means for waiting for the return signal from at least one of said other nodes of said plurality of nodes comprises means for waiting for the time slot clock signal to be received and retransmitted by each of said other nodes of said plurality of nodes and arrive back at said one node.

29. A communications node as recited in claim 28, wherein signal data is added or dropped from the time slot clock signal when the time slot clock signal is received and retransmitted by each of said other nodes.

30. A communications node as recited in claim 16, wherein said one node of said plurality of nodes is a master node that transmits and maintains a system bit clock using a broadcast wavelength.

31. A communications node for an optical fiber network, said communications node comprising:
- a fixed wavelength receiver for receiving optical data;
- a tunable wavelength transmitter for transmitting optical data to destination nodes at a plurality of destination wavelengths; and
- a media access controller which determines a slot clock based on a system clock signal received by the fixed wavelength receiver time slots;

wherein the tunable wavelength transmitter uses the slot clock to determine a slot in which the optical data is to be transmitted.

32. A communications node as recited in claim 31, wherein said fixed wavelength receiver comprises a burst mode receiver.

33. A communications node as recited in claim 32, wherein said burst mode receiver comprises a phase shifter to provide a phase-shifted system clock.

34. A communications node as recited in claim 31, wherein said fixed wavelength receiver comprises at least two direct digital synthesizers receiving the same control signal from a controller, used to shift the phase of the receiving optical data.

35. A communications node as recited in claim 34, wherein said fixed wavelength receiver is capable of creating a phase controlled high bitrate clock.

36. A communications node as recited in claim 31, wherein said fixed wavelength receiver comprises a phase-lock-loop.

37. A burst mode receiver for optical data comprising:
- a phase shifter, receiving a system clock and producing a phase-shifted clock;
- a controller in communication with and controlling the phase shifter; and
- a sample unit, receiving a phase-shifted clock and producing sampled data.

38. A burst mode receiver as recited in claim 37, wherein said phase shifter comprises at least two direct digital synthesizers receiving a control signal from a second controller, used to shift a phase of the received optical data.

39. A burst mode receiver as recited in claim 38, wherein said burst mode receiver is capable of creating a phase controlled high bitrate clock.

40. A burst mode receiver as recited in claim 38, wherein said phase shifter is configured to shift a phase of a received signal when said at least two direct digital synthesizers receive a changed control word from said second controller.

* * * * *

UNITED STATES PATENT AND TRADEMARK OFFICE
CERTIFICATE OF CORRECTION

PATENT NO. : 6,738,582 B1
DATED : May 18, 2004
INVENTOR(S) : Moshe et al.

It is certified that error appears in the above-identified patent and that said Letters Patent is hereby corrected as shown below:

<u>Title page,</u>
Item [73], Assignee, should read -- Matisse Networks, Mountain View, CA (US) --

Signed and Sealed this

Thirteenth Day of July, 2004

JON W. DUDAS
*Acting Director of the United States Patent and Trademark Office*